United States Patent [19]
Konuma

[11] Patent Number: 5,748,232
[45] Date of Patent: May 5, 1998

[54] IMAGE SENSOR AND DRIVING METHOD FOR THE SAME

[75] Inventor: Kazuo Konuma, Tokyo, Japan

[73] Assignee: NEC Corporation, Tokyo, Japan

[21] Appl. No.: 857,584

[22] Filed: May 16, 1997

Related U.S. Application Data

[63] Continuation of Ser. No. 479,402, Jun. 7, 1995, abandoned, which is a continuation of Ser. No. 216,955, Mar. 24, 1994, abandoned.

[30] Foreign Application Priority Data

Apr. 6, 1993 [JP] Japan ................................. 5-078432

[51] Int. Cl.$^6$ ............................................. H04N 5/225
[52] U.S. Cl. ................................. 348/219; 348/311
[58] Field of Search ................................. 348/219, 311, 348/314, 316, 317, 319; 257/228, 232, 233; H04N 5/335

[56] References Cited

U.S. PATENT DOCUMENTS

| 4,651,001 | 3/1987 | Harada et al. | 257/232 |
|---|---|---|---|
| 4,794,279 | 12/1988 | Yamamora et al. | 257/232 |
| 4,995,061 | 2/1991 | Hynecek | 348/314 |
| 5,274,476 | 12/1993 | Lee | 257/232 |

OTHER PUBLICATIONS

Yasuo Ishihara et al., "Interline CCD Image Sensor with an Anti Blooming Structure", Digest of Technical Papers, Feb. 1982 IEEE International Solid State Circuits Conference, pp. 168 and 169.

Kazuo Konuma et al., "324 x 487 Schottky–Barrier Infrared Imager", IEEE Transactions on Electron Devices, vol. 37, No. 3, Mar. 1990, pp. 629–635.

H. T. Brown, GEC Journal of Science & Tech., vol. 43, No. 3, 1977, pp. 125–133.

*Primary Examiner*—Andrew Faile
*Assistant Examiner*—Andrew B. Christensen
*Attorney, Agent, or Firm*—Young & Thompson

[57] ABSTRACT

The present invention provides an image sensor of the charge transfer type which employs solid-state image pickup devices and a method of driving the image sensor. Gate electrodes to which pulse voltages can be applied and which preferably are transparent are disposed at a period distance shorter than the spatial arrangement period distance of pixels on light receiving faces of light receiving elements formed from photodiodes or like elements. Upon imaging using the image sensor, the combination of voltage to be applied to the gate electrodes is varied to vary sampling points of the light receiving faces in accordance with an environment or an object of use of the image sensor so that a fixed resolution and a fixed sensitivity can be obtained.

8 Claims, 6 Drawing Sheets

IMAGE SENSOR AND DRIVING METHOD FOR THE SAME

This application is a continuation of application Ser. No. 08/479,402, filed Jun. 7, 1995, which is a continuation of Ser. No. 08/216,955, filed Mar. 24, 1994, both now abandoned.

BACKGROUND OF THE INVENTION

1. Field of the Invention

This invention relates to an image sensor and a method for driving an image sensor and, more particularly, to an image sensor of the charge transfer type which employs solid-state image pickup devices used in various fields, such as the field of video cameras.

2. Description of the Related Art

An image sensor of the charge transfer type which employs solid-state image pickup devices makes up a picture frame wherein pixels each including a light receiving element in the form of a semiconductor device for photo-electrically converting incident light and a transfer pixel electrode for individually controlling the timings of accumulation and transfer of charges converted by the light receiving element are arranged horizontally and vertically in a matrix. Charge accumulated in individual pixels is successively transferred alternately by way of a vertical shift register and a horizontal shift register in a period defined by the spatial arrangement distance of the pixels, and charge signals of a picture frame obtained by photoelectric conversion are outputted in a time series relationship from an output terminal.

An example of a construction of a conventional image sensor based on Y. Ishihara et al., "Interline CCD Image Sensor with an Anti Blooming Structure" (ISSCC Digest of Technical Papers, pp. 168–169, February 1982) is shown in FIG. 1. The image sensor has a construction wherein pixels each include a light receiving element 1, CCD (Charge Coupled Device) registers 2 and transfer gate area 3 are arranged in a matrix, and is called an interline image sensor. Light receiving element 1 is formed from, for example, of a p-n silicon (Si) junction, and photo-electrically converts incident light to generate a signal charge corresponding to the amount of light and accumulates the signal charge into an electrostatic capacitor within the element. The light receiving element may sometimes have a Schottky junction between a very thin P-Si film and have p-Si in place of a Si p-n junction in order for the element to exhibit sensitivity in the infrared region. CCD registers 2 includes, for example, a flush N-channel, and a pixel electrode arranged on the channel and formed from $SiO_2$ and polycrystalline silicon. The intensities of light detected by the pixels arranged in a matrix in the light receiving area are successively outputted as corresponding signal charges from output terminal 6 in response to driving pulses $\phi V1$ to $\phi V4$ and $\phi VLast$ applied to the pixel electrodes of the pixels. The signal charges of the pixels are transferred from the top to the bottom in FIG. 1 in vertical CCD registers 4 but from the left to the right in FIG. 1 in horizontal CCD registers 5. The incident light intensity distribution in the light receiving area plane is outputted in a time series relationship in this manner.

A CCD image sensor of the FIT type is different than the construction of CCD registers as described above, but similar to those described above in terms of the construction and operation of pixels. Also, the pixels of an image sensor of the so-called charge swept device (CSD) type and the pixels of an image sensor of the MOS type are similar to those of an image sensor of the interline type, in that a pixel, in all three image sensor types, is constituted from a single light receiving element and a signal charge transfer element. Each of the image sensors mentioned above carries out a spatial sampling of the in-plane light intensity distribution of incident light irradiated upon the light receiving area using a cycle spatial period of the pixels, that is, a cycle spatial period of the light receiving elements, as a minimum sampling period.

However, the required specifications of an image sensor for optimum spatial resolution, sensitivity, frame rate and some other parameters vary depending upon the conditions of use of the image sensor and/or the characteristics of a subject for imaging. For example, when the subject to be imaged by an image sensor camera is a stationary or slowly moving object, and a detailed image is required, the frame rate requirements are moderate, but the spatial resolution requirements are high. In contrast, when the subject to be imaged is moving at a high speed, the spatial resolution requirements may be low, but the frame rate requirements are high. Further, since the condition of the subject or the output in most cases vary in time, the optimum values for the requirements described above also vary as time passes.

The characteristics of spatial resolution, sensitivity, frame rate and certain other parameters have a close relationship with one another. In particular, if the cycle period of the pixels is increased and the pixel area is reduced, then the size of the light receiving elements is reduced, resulting in reduction of the sensitivity. If an additional element is provided in each pixel, the occupation area rate of the light receiving element in the pixel is reduced, and the sensitivity is reduced incidentally. On the other hand, when the data reading out rate is fixed, if the number of cells is increased, the frame rate is reduced. In this manner, the pixel area, the sensitivity, the number of cells, and the frame rate limit the performance of the other parameters relative to one another.

A conventional image sensor performs spatial sampling of the in-plane light intensity distribution of incident light irradiated upon the light receiving area using the cycle spatial period of the pixels arranged in a matrix as the minimum sampling period as described above. In particular, the cycle period of pixels makes a basic unit of sampling periods, and a spatial resolution of a period shorter than the cycle period of the pixels cannot be obtained. Consequently, the cycle period of the pixels must be set to a period equal to or longer than the desired spatial resolution.

In other words, since the maximum value of the spatial resolution depends upon the cycle period of the pixels, the cycle period of the pixels in a conventional image sensor is determined by estimating the highest value within a range of values within which the spatial resolution required during use of the image sensor varies. This signifies that, where a single camera is involved, when the requirement for sensitivity or frame rate becomes higher than the requirement for spatial resolution, the combination of performance specifications cannot be optimized. Accordingly, because conversational cameras are not for multi-purpose use, a number of cameras employing an image sensor having specific use specifications, such as, for example, a high resolution camera, a high sensitivity camera for low illuminance conditions, and a high frame rate camera for high speed imaging techniques, must be selectively and individually used in accordance with the condition of use present at the time.

SUMMARY OF THE INVENTION

It is an object of the present invention to provide an image sensor, eliminating the drawbacks of the conventional systems described above. According to the present invention, the resolution of an image sensor can be varied to a frequency range shorter than the pixel cycle period. Also, a method of driving the image sensor, according to the present invention, is disclosed.

A charge transfer image sensor according to the present invention, comprises a number of pixel electrodes greater than the number of unit cells disposed at an equal spatial period distance which is shorter than the spatial period distance of the unit cells on light receiving faces of light receiving elements with an insulating film interposed between them, and application voltage applying means for applying predetermined pulse voltages to the pixel electrodes.

Preferably, the insulating film and the pixel electrodes are made of a transparent substance or substances.

In the present invention, the electrodes are disposed at a period distance shorter than the cycle spatial period distance of the cell matrix on the light receiving elements with the insulating film interposed between them and different pulses are applied to the electrodes so that the in-plane potential distributions of the light receiving elements constituting the pixels are varied with respect to time. Since each of the light receiving elements has a sensitivity depending upon the potential thereof, by applying the pulse voltages to the electrodes of the light receiving element, the light receiving element can be provided with a sensitivity distribution in accordance with the potential distribution, and the sensitivity distribution can also be varied with respect to time. While, in an image sensor wherein pixels are arranged in a matrix, incident light is sampled by spatial sampling by light receiving elements, where pulse voltages are applied from the outside to control the sensitivity distribution in each light receiving element using the method described above, the center of light sensitivity in spatial sampling in accordance with the sensitivity distribution can be varied with respect to time.

In other words, in-plane light intensity distribution sampling having a different center of light sensitivity can be performed with pulse voltages applied from the outside. By combining a plurality of fields having different centers of light sensitivity in spatial sampling, that is, different distributions of sampling points, to make up a single frame, a spatial resolution of a higher period than the cycle period of the pixels arranged in a matrix can be obtained. Consequently, a high resolution can be obtained with a reduced number of pixels.

Further, the distribution of sampling points or the magnitude of sampling points described above can be controlled by varying the pulse voltages to be applied from the outside. In the case of rear-face irradiation image sensors, the light receiving area is not disturbed at all even if pixel electrodes are additionally provided on the light receiving elements. On the contrary, in the case of front-face irradiation image sensors, transparent electrodes are preferably employed as pixel electrodes in order to assure that the light receiving area is not obstructed.

As described above, according to the present invention, spatial sampling of a period shorter than the cell cycle period can be performed without disturbing the effective light receiving area. Further, by varying the combination of pulse voltages to be applied from the outside to the pixel electrodes on the light receiving elements, the positions of the centers of light sensitivity in spatial sampling and the extent of sampling points can be selected arbitrarily. In other words, by controlling the spatial resolution of the image sensor from the outside, the sensitivity can be varied arbitrarily in a period shorter than the cycle period of the cells.

The above and other objects, features, and advantages of the present invention will become apparent from the following description referring to the accompanying drawings which will illustrate examples of preferred embodiments of the present invention.

DETAILED DESCRIPTION OF THE PREFERRED EMBODIMENTS

Figure 1:
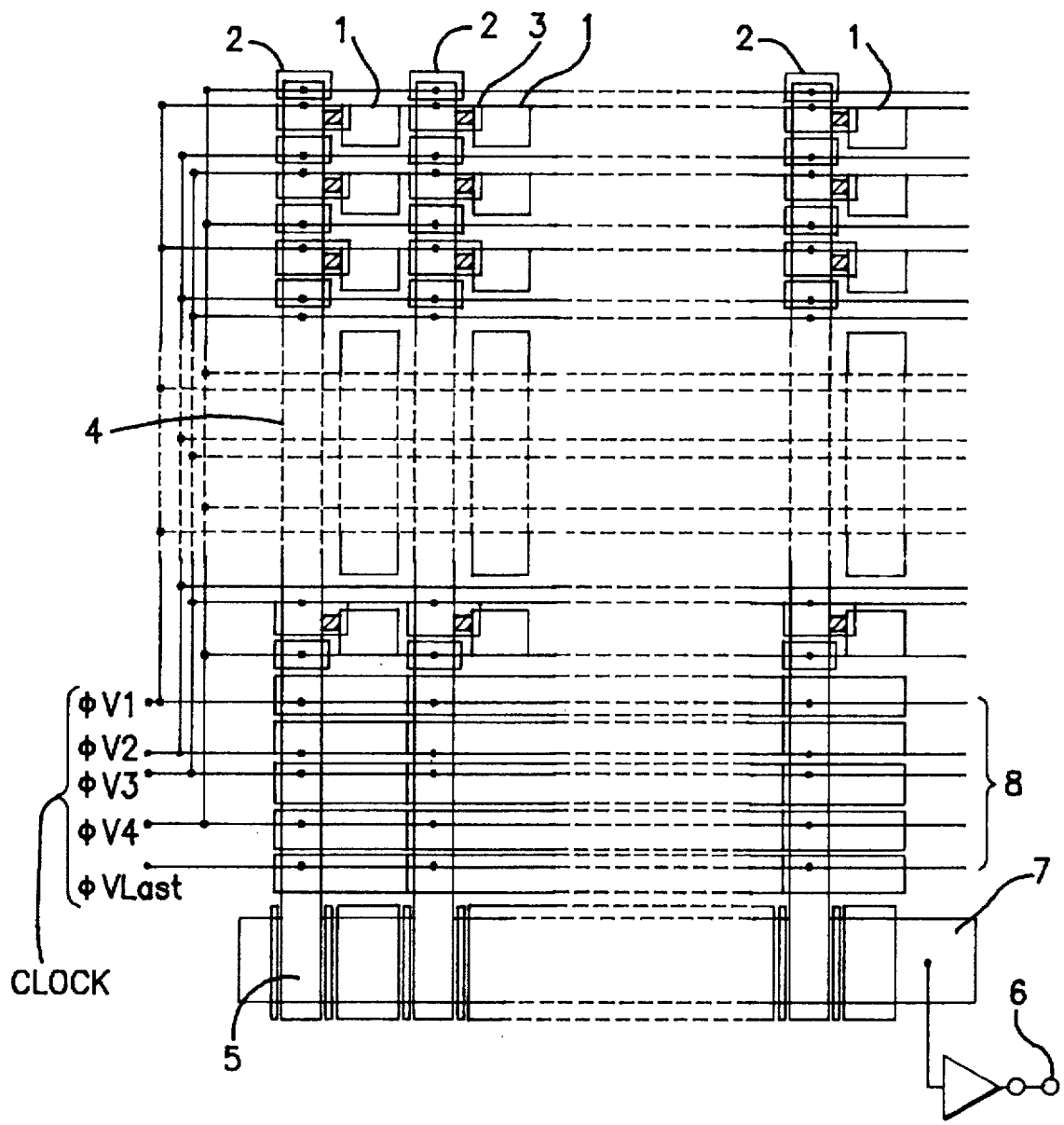
FIG. 1 is a schematic diagram of an example of a conventional image sensor.
Figure 2:
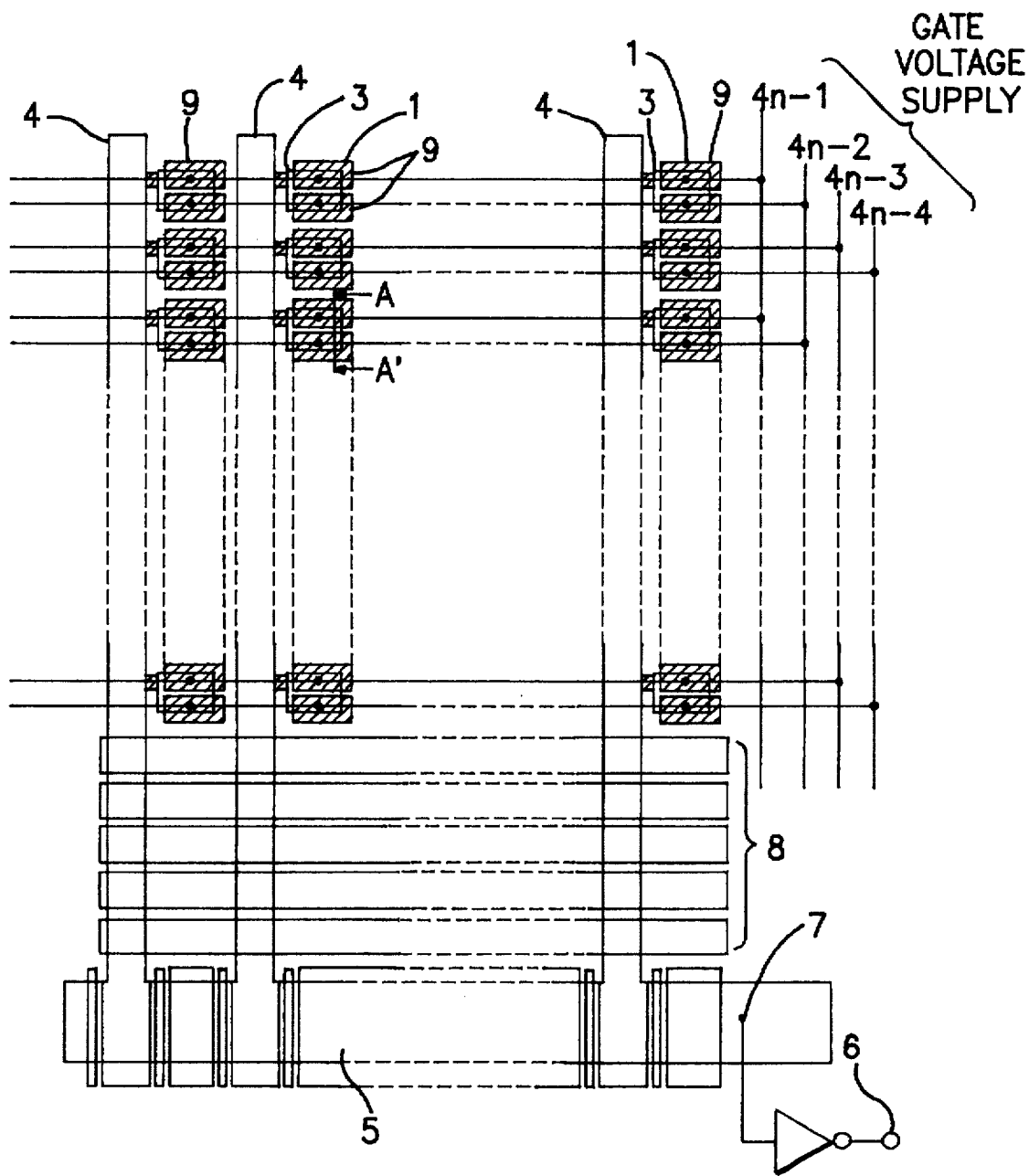
FIG. 2 is a schematic diagram of a first embodiment of the image sensor of the present invention.
Figure 3:
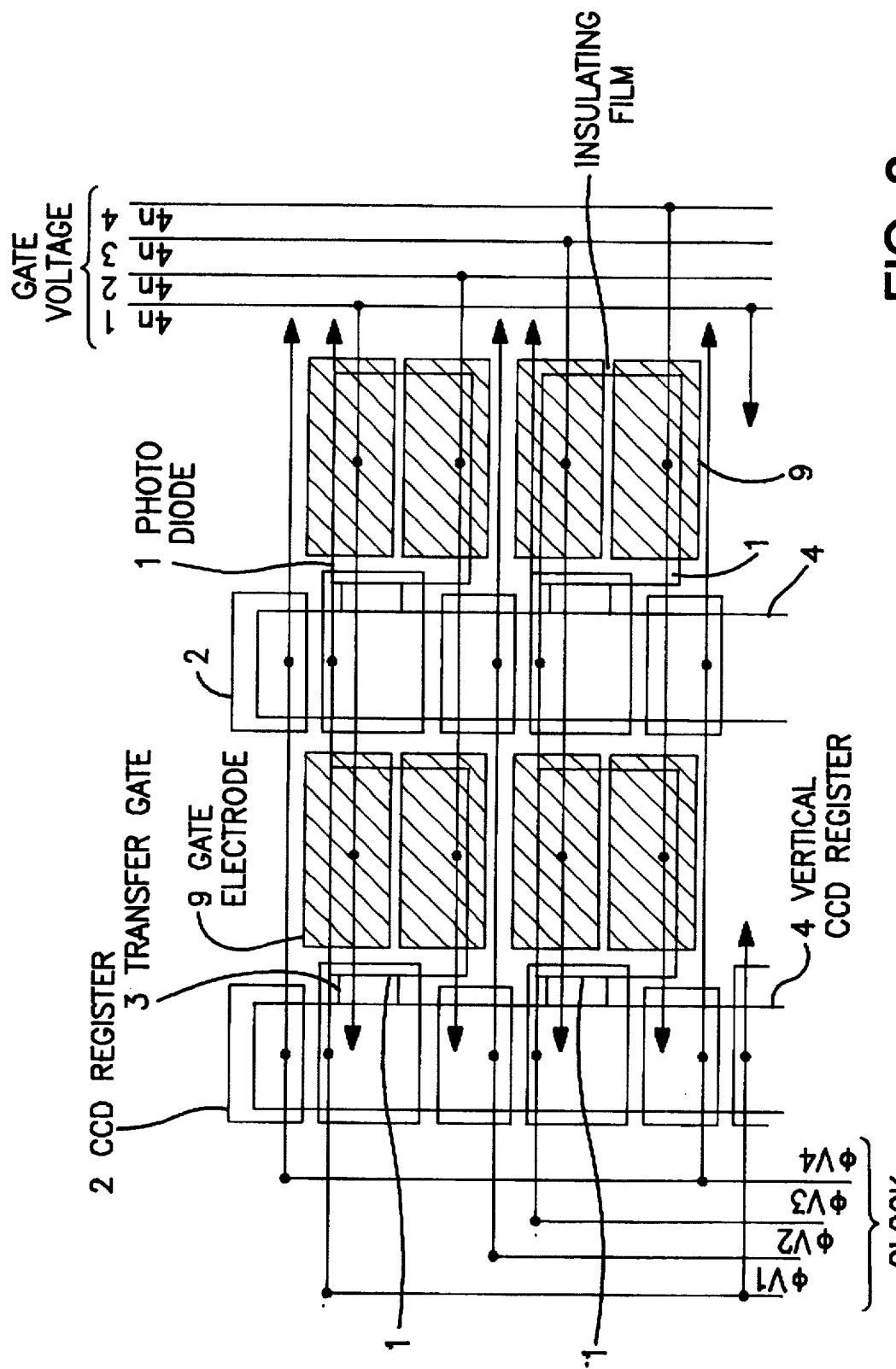
FIG. 3 is an enlarged view of a pixel of FIG. 2.
Figure 4:
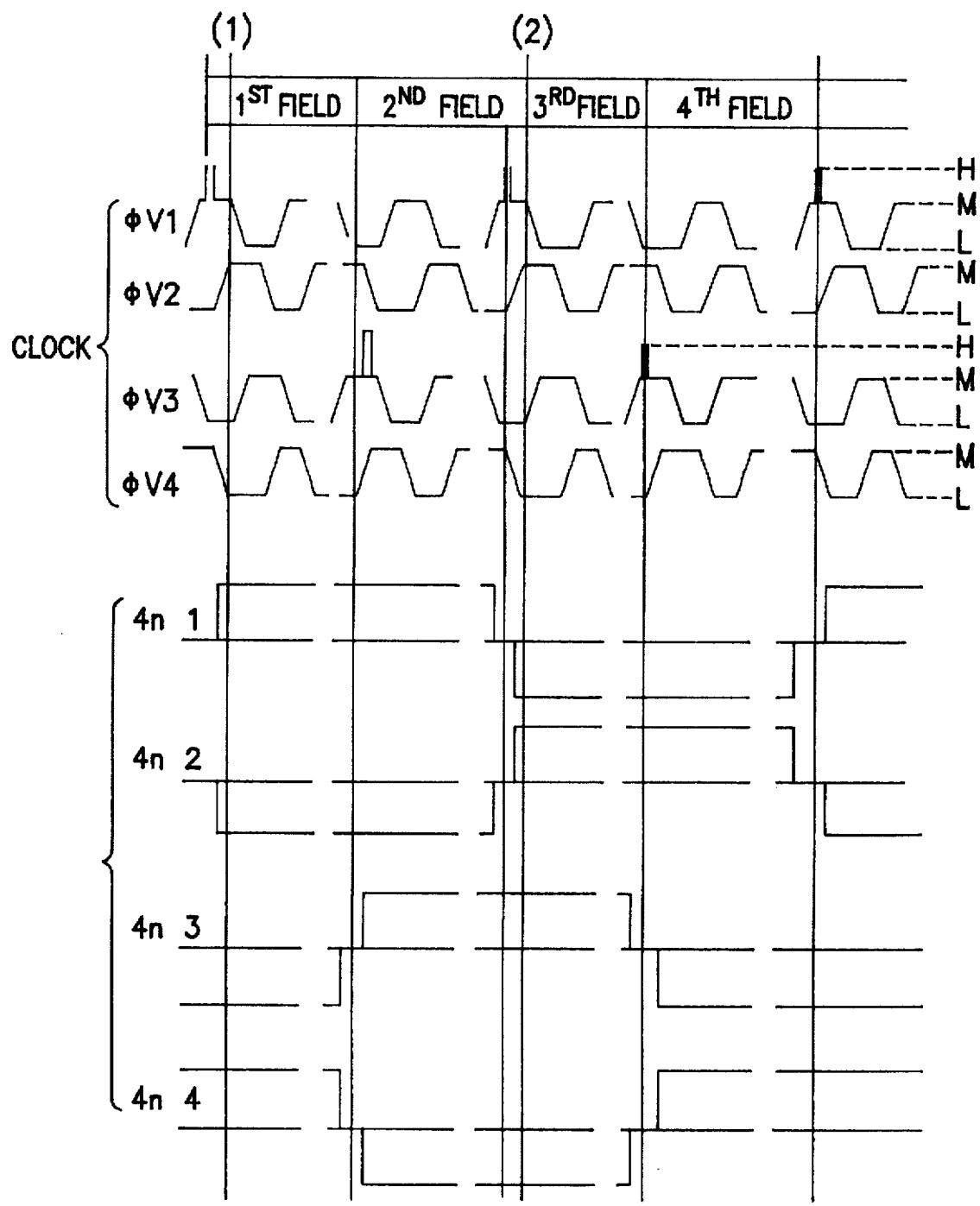
FIG. 4 is an example of a timing chart of a driving method for the image sensor of the present invention.

Referring to FIGS. 2 and 3, each unit picture element or pixel of the image sensor of the present embodiment is constituted of light receiving element 1 formed from, for example, a Si p-n junction, vertical CCD register 4 in the form of a depletion type n-type silicon gate, transfer gate area 3 formed from an enhancement type MOSFET, and a pair of pixel electrodes 9 disposed above light receiving element 1 with an insulating film interposed therebetween. The pixels are arranged in M rows in a horizontal direction and in N columns in a vertical direction to form a picture frame. Paired pixel electrodes 9 in the present embodiment cover the upper and lower halves of the light receiving faces of the light receiving elements, and each of pixel electrodes 9 is connected to pixel electrode 9 on an adjacent light receiving element in the horizontal direction by way of one of 2M horizontal connection lines. Further, the horizontal connection lines are successively connected to each fourth line spaced vertically to four voltage application lines 4n1 to 4n4. The pixels in the Mth row at the last stage in the vertical direction are connected to horizontal CCD registers 5 by way of dummy gates 8, and signals transferred to horizontal CCD registers 5 are read out by read-out section 7 and outputted from output terminal 6 of an amplifier to the outside in response to pulse signals applied to pixel electrodes φV1 to φV4. While the insulating film and the pixel electrodes on light receiving element 1 must be transparent so that they do not create an obstacle to incident light from the front faces of the light receiving elements, where light is introduced into the light receiving elements from the rear face side, they need not necessarily be transparent, as previously published by the inventors ("324 X 487 Schottky Barrier Infrared Imager", IEE TRANSACTIONS ON ELECTRON DEVICES, Vol. 37, No. 3, March 1990, pp. 629-635).

Figure 5:
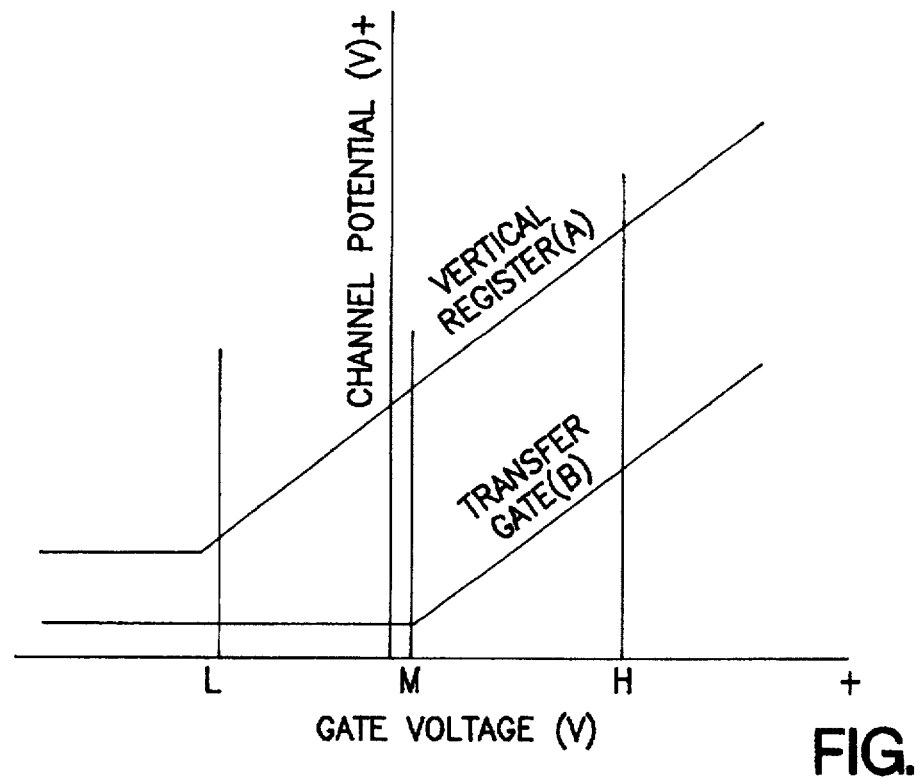
FIG. 5 is a diagram illustrating the relationships between the application of voltage to a pixel electrode of the image sensor and the channel potentials at a CCD and a transfer gate area.

Next, the operation of the image sensor of the present embodiment will be described with reference to FIGS. 4 to 6B. In the driving timing chart of FIG. 4, three-valued pulses of high value H, low value L or medium value M are applied to two pixel electrodes $\phi V2$ and $\phi V4$ of the vertical CCD registers 4 while two-valued pulses of low value L or medium value M are applied to the other two electrodes $\phi V2$ and $\phi V4$. Each of the light receiving elements is supplied with one of four voltage waveforms having different phases from one another from one of voltage application lines 4n1 to 4n4. FIG. 5 illustrates the characteristics of the gate application voltage to the channel potential of each channel with the characteristics of vertical CCD registers 4 and transfer gate 3 represented by A and B, respectively. As seen from FIG. 5, the channel potential is determined in accordance with each potential level H, L and M of the application voltage.

Figure 6A:
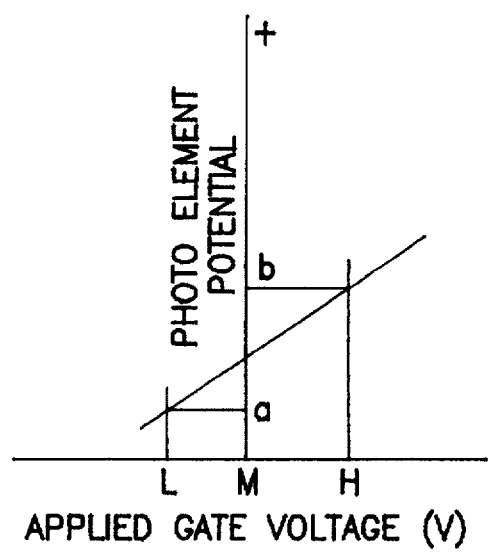
FIG. 6A is a diagram illustrating the potential distribution in a light receiving element of the image sensor of the present invention and is a diagram illustrating the relationship between the application of voltage to a pixel electrode of the light receiving element and the potential of the light receiving element.
Figure 6B:
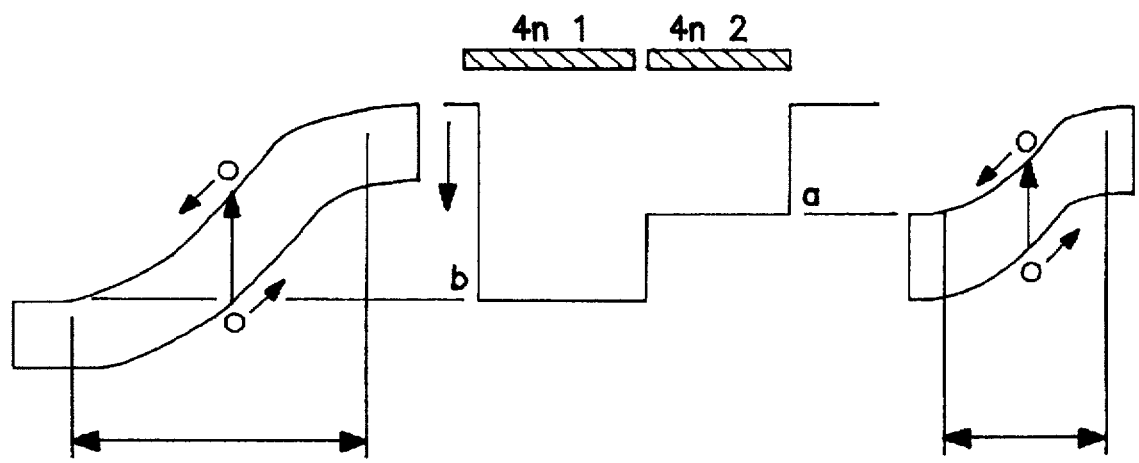
FIG. 6B is a diagram illustration the potential distribution in a light receiving element of the image sensor of the present invention and is a diagram illustrating the potential distribution of the light receiving element.

The potential distribution in a light receiving element varies, as seen from FIGS. 6A and 6B, depending upon the contribution of the application voltage to the transfer gate, the pixel electrodes on the light receiving element and the incident light or dark current. FIG. 6A shows the potentials of light receiving elements which are controlled by the pixel electrodes on the light receiving elements at time (1) of FIG. 4. When a positive gate application voltage is applied, the potential of a light receiving element becomes high; conversely, when a negative gate application voltage is applied, the potential of the light receiving element becomes low. The center of FIG. 6B shows a potential distribution at a portion of a pixel in section taken along line A—A of FIG. 2 at time (1) in FIG. 4, and the distribution relies upon the channel potential characteristic (refer to A of FIG. 5) of the vertical CCD register. The left end and the right end of FIG. 6B show potential diagrams of a p-n photodiode, which is a light receiving element, corresponding to a location below a 4n1 pixel electrode and another location below a 4n2 pixel electrode at the center in FIG. 6B, respectively. A depletion layer extends within the ranges indicated by the arrows in FIG. 6B on the opposite sides of the p-n junction due to a reverse bias voltage applied to the p-n photodiode. When light is introduced into the photodiode, electron-hole pairs are produced, and the electron-hole pairs are separated by the electric field of the depletion layer to make an electric signal. As the width of the depletion layer area indicated by the length between the opposite ends of the arrows increases and as the electric field of the depletion layer increases, the rate of production of an electric signal, that is, the sensitivity, increases. As is apparent from FIG. 6B, when a positive application voltage is applied to the pixel electrode of a light receiving element, the sensitivity of the photodiode area below the pixel electrode is higher than when a negative application voltage is applied to the pixel electrode. In short, in the pixel electrode arrangement shown at the center of FIG. 6B, the sensitivity distribution in the light receiving element can be controlled by the application voltage to the pixel electrodes. In the view shown at the center of FIG. 6B, the center of light sensitivity is positioned below the 4n1 pixel electrode on the left side in the light receiving element. At another time (2) of FIG. 4, the pixel electrode application voltages on the light receiving element are reversed on the left and the right, and the center of the distribution of light density is positioned in a displaced condition below the 4n2 pixel electrode on the right side of the light receiving element. Accordingly, the center of light sensitivity and the extent of the sensitivity area can be controlled by varying the combination of the gate application voltages described above.

In the following, the moving condition of the center of light sensitivity in a light receiving element is described in detail with reference to a timing chart. First, in the first set of light receiving elements, reading out and resetting are performed at the beginning of the first field period, and photoelectric conversion and accumulation of signal charges are started immediately. Then, for the two first and second field periods until reading out and resetting are performed at the beginning of the third field period, photoelectric conversion and the accumulation of signal charges are performed continuously. Within one period, due to a positive application voltage to the 4n1 pixel electrode of each light receiving element and a negative application voltage to the 4n2 pixel electrode, the center of light sensitivity of each light receiving element is positioned above the center of the light receiving element. Then, immediately after the first reading out and resetting operations in the third field period, new photoelectric conversion and the accumulation of signal charges are started. Photoelectric conversion and accumulation of signal charges are continued until the reading out and resetting operations at the beginning of the first field period of the next frame period. During the third and fourth field periods, the voltages applied to the 4n1 and 4n2 pixel electrodes are reversed so that a positive application voltage is applied to the 4n2 pixel electrode and, consequently, in each light receiving element of the first set of light receiving elements, the center of light sensitivity is positioned lower than the center of the light receiving element. In other words, the first set of light receiving elements image, within the first and second field periods, when the light sensitivity of each light receiving element is positioned higher than the light receiving element, but image, within the third and fourth field periods, when the center of the distribution of light density of each light receiving element is positioned lower than the light receiving element.

The second set of light receiving elements are also controlled similarly in accordance with the application voltages to the pixel electrodes so that they image, within the second and third field periods, when the center of light sensitivity of each light receiving element is positioned higher than the light receiving element, but image, within the fourth and first field periods, when the center of the distribution of light density of each light receiving element is positioned lower than the light receiving element. In short, within an imaging period for one frame, the first and second sets of light receiving elements perform sampling with the four different centers of light sensitivity; as a result, the number of sampling points is twice that of the pixels.

In the present embodiment, the reason why voltages 4n1 to 4n4 to be applied to pixel electrodes 9 of a light receiving element at the time of reading out and resetting are set to 0 V (refer to FIG. 4) is that where transfer gates 3 are provided above the light receiving elements 1 as shown in FIG. 2, it is desired to eliminate the situation that the reading out operation becomes insufficient due to the influence of the potential distributions in light receiving elements 1 by the application voltages to pixel electrodes 9 on the light receiving elements. Where transfer gate areas 3 are provided at central locations of the light receiving elements 1 which are the boundary positions of pixel electrodes 9 on the light receiving elements, gate voltages 4n1 to 4n4 need not necessarily be set to 0 V.

Since the center of light sensitivity in a light receiving element can be displaced to an arbitrary position by the voltages to be applied to the pixel electrodes on the light receiving element, the sampling points can be increased to a fixed multiplication number by varying the arrangement of the pixel electrodes on the light receiving element and the combination of the application voltages to increase the number of fields in one frame.

Figure 7:
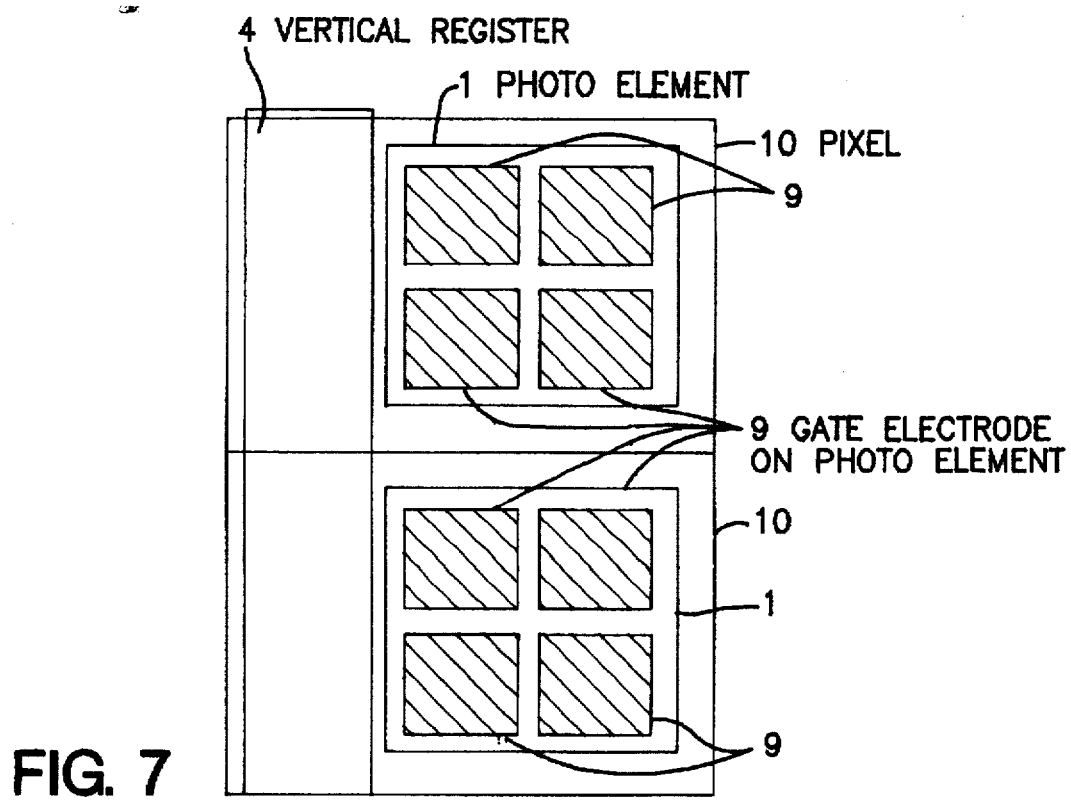
FIG. 7 is a schematic diagram of a second embodiment of the image sensor of the present invention.

FIG. 7 is a view showing the light receiving element of a second embodiment of the present invention. In the arrangement shown in FIG. 7, four pixel electrodes are disposed above the light receiving element. In the present embodiment, the position of the center light sensitivity in the light receiving element can be determined arbitrarily by varying the combination of voltages to be applied to the four pixel electrodes.

Meanwhile, although an example wherein a p-n junction type photodiode is employed as the light receiving element is descried in the embodiment described above, the present invention can also be applied to another case wherein a light receiving element having a transistor structure is employed. Further, in an infrared image sensor wherein the light receiving element is constituted from a very thin P-Si film, which has a high layer resistance and produces a potential difference in a plane, and from a Schottky diode of p-type Si, a potential distribution can be formed in the light receiving element by applying voltages to pixel electrodes on the light receiving element. Accordingly, the present invention can also be applied to an infrared image sensor.

It is to be understood that variations and applications of the image sensor and the driving method therefor disclosed herein will be evident to those skilled in the art. It is intended that all such modifications and variations be included within the scope of the appended claims.

What is claimed is:

1. An image sensor, comprising:
a plurality of light receiving pixel elements, each of said plurality of light receiving elements including a light receiving face for photo-electrically converting incident light into a signal charge, and for accumulating said signal charge;

a plurality of signal charge transfer gates, each of said plurality of signal charge transfer gates being formed without overlapping with the light receiving face of each of said plurality of light receiving pixel elements, for reading out the signal charge accumulated in each of said plurality of light receiving pixel elements;

a light receiving area made of a plurality of unit cells, each unit cell of said plurality of unit cells comprising one of said plurality of light receiving pixel elements and one of said plurality of signal charge transfer gates, said plurality of unit cells being disposed in matrix form at an equal spatial periodic distance;

outputting means connected to said plurality of signal charge transfer gates for sequentially outputting the signal charges read from the said plurality of unit cells in a time series relationship;

a plurality of groups of at least two adjacent, non-overlapping pixel electrodes, each of said plurality of groups being disposed above a respective light receiving face of each of said plurality of light receiving pixel elements at an equal spatial periodic distance, said spatial periodic distance of said pixel electrodes being shorter than a spatial periodic distance between said plurality of unit cells, said adjacent, non-overlapping pixel electrodes having an insulating film interposed therebetween; and application voltage applying means for applying predetermined voltages of different phases to each of said plurality of groups of pixel electrodes.

2. An image sensor as claimed in claim 1, wherein said insulating film and said pixel electrodes are made of at least one transparent substance.

3. An image sensor as claimed in claim 1, wherein a number of said pixel electrodes is an integer multiple of a number of said plurality of unit cells.

4. An image sensor as claimed in claim 1, wherein each of said light receiving pixel elements is a photodiode formed from a silicon p-n junction.

5. An image sensor as claimed in claim 1, wherein each of said light receiving pixel elements is a Schottky diode of a very thin PtSi film and p-type Si.

6. An image sensor as claimed in claim 1, wherein said pixel electrodes are dimensioned so that a substantially overall area of the light receiving face of each of said plurality of light receiving pixel elements is covered with all of the pixel electrodes existing above the light receiving face.

7. A method of driving an image sensor by applying a series of driving pulses to a plurality of pixel electrodes disposed on a plurality of light receiving pixel elements, wherein said method comprises the steps of:

providing more than one pixel electrode above each light receiving pixel element at an equal spatial periodic distance, said spatial periodic distance of said pixel electrodes being shorter than a spatial periodic distance between said plurality of light receiving pixel elements, said pixel electrodes being divided in at least one group, each of said light receiving pixel elements photo-electrically converting incident light into a signal charge and accumulating the signal charge;

generating a plurality of series of driving pulses of different voltages;

applying each of said series of driving pulses to said at least one group of pixel electrodes; and sequentially reading out said signal charge from each of said light receiving pixel elements using charge transfer elements which are separate from said pixel electrodes.

8. A method of driving an image sensor as claimed in claim 7, wherein, at a time at which said signal charge is read out for each of the light receiving elements, a voltage value to be applied to the pixel electrodes is 0 V with respect to a ground potential.

* * * * *